(12) United States Patent
Khaire et al.

(10) Patent No.: US 11,725,696 B2
(45) Date of Patent: Aug. 15, 2023

(54) SENSOR BEARING UNIT AND ASSOCIATED ASSEMBLY METHOD

(71) Applicant: AKTIEBOLAGET SKF, Gothenburg (SE)

(72) Inventors: Maruti Vitthal Khaire, Pune (IN); Manoj M Babu, Hosur (IN)

(73) Assignee: AKTIEBOLAGET SKF, Gothborg (DE)

( * ) Notice: Subject to any disclaimer, the term of this patent is extended or adjusted under 35 U.S.C. 154(b) by 0 days.

(21) Appl. No.: 17/740,541

(22) Filed: May 10, 2022

(65) Prior Publication Data

US 2022/0364603 A1 Nov. 17, 2022

(30) Foreign Application Priority Data

May 17, 2021 (IN) .............................. 202141022132

(51) Int. Cl.
| F16C 19/06 | (2006.01) |
| F16C 41/00 | (2006.01) |
| F16C 43/04 | (2006.01) |
| G01P 3/44 | (2006.01) |

(52) U.S. Cl.
CPC ............ *F16C 41/007* (2013.01); *F16C 19/06* (2013.01)

(58) Field of Classification Search
CPC ........ F16C 19/06; F16C 19/16; F16C 19/163; F16C 33/583; F16C 35/073; F16C 35/077; F16C 35/586; F16C 41/007; F16C 2226/74; F16C 2233/00; G01P 3/443
See application file for complete search history.

(56) References Cited

U.S. PATENT DOCUMENTS

| 3,890,517 A * | 6/1975 | Marsh | G01P 3/443 310/168 |
| 4,259,637 A * | 3/1981 | Bloomfield | G01P 3/481 324/207.16 |
| 4,875,785 A * | 10/1989 | Santos | G01P 3/443 384/618 |
| 5,310,266 A * | 5/1994 | Coux | G01P 3/443 324/207.25 |
| 6,231,241 B1 | 5/2001 | Ohkuma | |
| 6,392,405 B1 * | 5/2002 | Nishizaki | G01P 1/00 29/894 |
| 7,429,133 B2 * | 9/2008 | Gallion | F16C 41/007 384/448 |
| 2020/0224725 A1 * | 7/2020 | Obermann | F16C 19/06 |

FOREIGN PATENT DOCUMENTS

FR 2301014 A1 9/1976

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A sensor bearing unit includes a bearing having a first ring and a second ring centered on an axis, and an impulse ring secured to the first ring of the bearing. The impulse ring includes a radial portion mounted in axial contact against a lateral face of the first ring of the bearing and at least one opening extending through the thickness of the radial portion such that a part of the lateral face of the first ring of the bearing is exposed through the at least one opening.

13 Claims, 8 Drawing Sheets

SENSOR BEARING UNIT AND ASSOCIATED ASSEMBLY METHOD

CROSS-REFERENCE

This application claims priority to Indian patent application no. 202141022132 filed on May 17, 2021, the contents of which are fully incorporated herein by reference.

TECHNOLOGICAL FIELD

The present disclosure is directed to a sensor bearing unit comprising a bearing and an impulse ring.

BACKGROUND

Today, sensor bearing units are commonly used in a wide range of technical fields, for example in the automotive industry and aeronautics. These units provide high quality signals and transmissions, while allowing integration in simpler and more compact apparatus.

A sensor bearing unit generally comprises a bearing, an impulse ring secured to the rotatable ring of the bearing, and a sensor unit or device for sensing the angular position of the impulse ring with respect to the fixed ring of the bearing.

Conventionally, the impulse ring is provided with a target holder secured onto the rotatable inner ring and with a magnetic target secured to the target holder. The sensor device may be secured to the fixed outer ring of the bearing and provided with a sensor element facing the magnetic target of the impulse ring in order to determine, on the basis of magnetic field variations, the angular position of the rotatable ring.

In some cases, the mounting of the sensor bearing unit inside the associated casing and/or onto the associated shaft may be difficult to achieve without damaging the impulse ring.

One aim of the present disclosure is to overcome this drawback.

SUMMARY

The disclosure relates to a sensor bearing unit comprising a bearing including a first ring and a second ring centered on an axis and an impulse ring secured to the first ring of the bearing.

According to a general feature, the impulse ring comprises a radial portion mounted in axial contact against a lateral face of the first ring of the bearing, and at least one opening extending through the thickness of the radial portion such that a part of the lateral face of the first ring of the bearing is accessible from the outside through the opening.

With such design, the through-opening of the impulse ring enables a user to axially push directly on the lateral face of the first ring of the bearing during the installation of the sensor bearing unit.

This leads to a simplified mounting of the sensor bearing unit without deterioration of the impulse ring.

The radial portion of the impulse ring may be in direct axial contact against the lateral face of the first ring of the bearing. Alternatively, the radial portion of the impulse ring may be in indirect axial contact against the lateral face of the first ring, i.e. with interposition of an element such as a washer.

Preferably, the opening of the impulse ring is radially located between the cylindrical bore and the cylindrical outer surface of the first ring of the bearing. The opening of the impulse ring may extend over an angular sector of from 35° to 55°.

In one embodiment, the impulse ring comprises a plurality of openings spaced apart in the circumferential direction.

Advantageously, the impulse ring may be secured into a groove formed on a cylindrical surface of the first ring of the bearing which is located radially on the side opposite to the second ring.

With such design, the impulse ring is not secured on a cylindrical surface of the first or second ring which radially faces the second or first ring, and is not located radially between the first and second rings. Therefore, if necessary, the bearing may be provided with seals each secured into a groove formed on a cylindrical surface of the first or second ring which radially faces the second or first ring. The seals may be radially disposed between the first and second rings.

In one embodiment, the sensor bearing unit further comprises a sensor device for detecting rotational parameters of the impulse ring secured to the second ring of the bearing. Alternatively, the sensor device may be secured on another part of the unit, for example a spacer shaft axially coming into contact with the second ring of the bearing.

The sensor device may comprise a sensor housing secured to the second ring of the bearing, and at least one sensor element supported by the sensor housing and cooperating the impulse ring.

In one embodiment, the sensor element of the sensor device axially faces the impulse ring. Alternatively, the sensor element may radially face the impulse ring.

In one embodiment, the impulse ring is made of metal and provided with alternating teeth and apertures and the sensor element of the sensor device is capable of sensing the metal impulse ring teeth and apertures.

The sensor element may directly face the impulse ring, or indirectly cooperate with the impulse ring, i.e. with interposition of an element axially between the impulse ring and the sensor element.

Preferably, the impulse ring is provided with a snapping portion engaged partly inside the groove of the first ring, the snapping portion having a L-shape in cross-section.

The snapping portion of the impulse ring may axially abut against a radial side wall of the groove of the first ring.

In one embodiment, the snapping portion of the impulse ring comprises a plurality of axial lugs spaced apart in the circumferential direction and each provided with a radial hook engaged inside the groove of the first ring. This facilitates the deformation of the snapping portion of the impulse ring for its mounting inside the groove of the first ring.

In one embodiment, the cylindrical surface of the first ring of the bearing has a stepped shape with a first cylindrical portion and with a second cylindrical portion radially offset towards the second ring with respect to the first cylindrical portion, the groove being axially located between the first and second cylindrical portions.

With such embodiment, the snapping portion of the impulse ring may be radially offset towards the second ring of the bearing with respect to the first cylindrical portion of the cylindrical surface or being flush with the first cylindrical portion.

Accordingly, the snapping portion of impulse ring does not protrude radially with respect to the cylindrical surface of the first ring. The radial boundary dimension of the bearing is unchanged. Accordingly, it is not necessary to foresee a specific shape on the part of the associated apparatus which is intended to receive the first ring of the bearing of the sensor bearing unit.

One of the side walls of the groove of the first ring may axially delimit the first cylindrical portion of the cylindrical surface of the first ring, and the other side wall of the groove may axially delimit the second cylindrical portion.

In a second alternative embodiment, the cylindrical surface of the first ring of the bearing may be provided with one single diameter.

The groove of the first ring may be provided with radial side walls. Accordingly, the groove is easy to machine on the first ring. Preferably, the groove has an annular form.

In one embodiment, the groove is formed on the inner bore of the first ring which forms the inner ring of the bearing. Alternatively, the groove may be formed on the outer cylindrical surface of the first ring which forms the outer ring of the bearing.

The disclosure also relates to a kit comprising a sensor bearing unit as previously defined, and a mounting tool provided with at least one tooth configured to be axially engaged into the opening of the impulse ring of the sensor bearing unit and to come into contact with the lateral face of the first ring without contacting the impulse ring.

The disclosure further relates to a method of assembling a sensor bearing unit as previously defined inside a casing or onto a shaft, wherein the method comprises at least the following step: mounting inside the casing or onto the shaft the first ring of the bearing of the sensor bearing unit by axial pushing directly on the lateral face of the first ring with a mounting tool having at least one tooth axially engaged through the opening of the impulse ring of the sensor bearing unit and coming into contact with the lateral face.

Preferably, during the mounting step, the axial contact between the tooth of the mounting tool and the lateral face of the first ring of the bearing of the sensor bearing unit is the only contact between the mounting tool and the sensor bearing unit.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION

Figure 1:
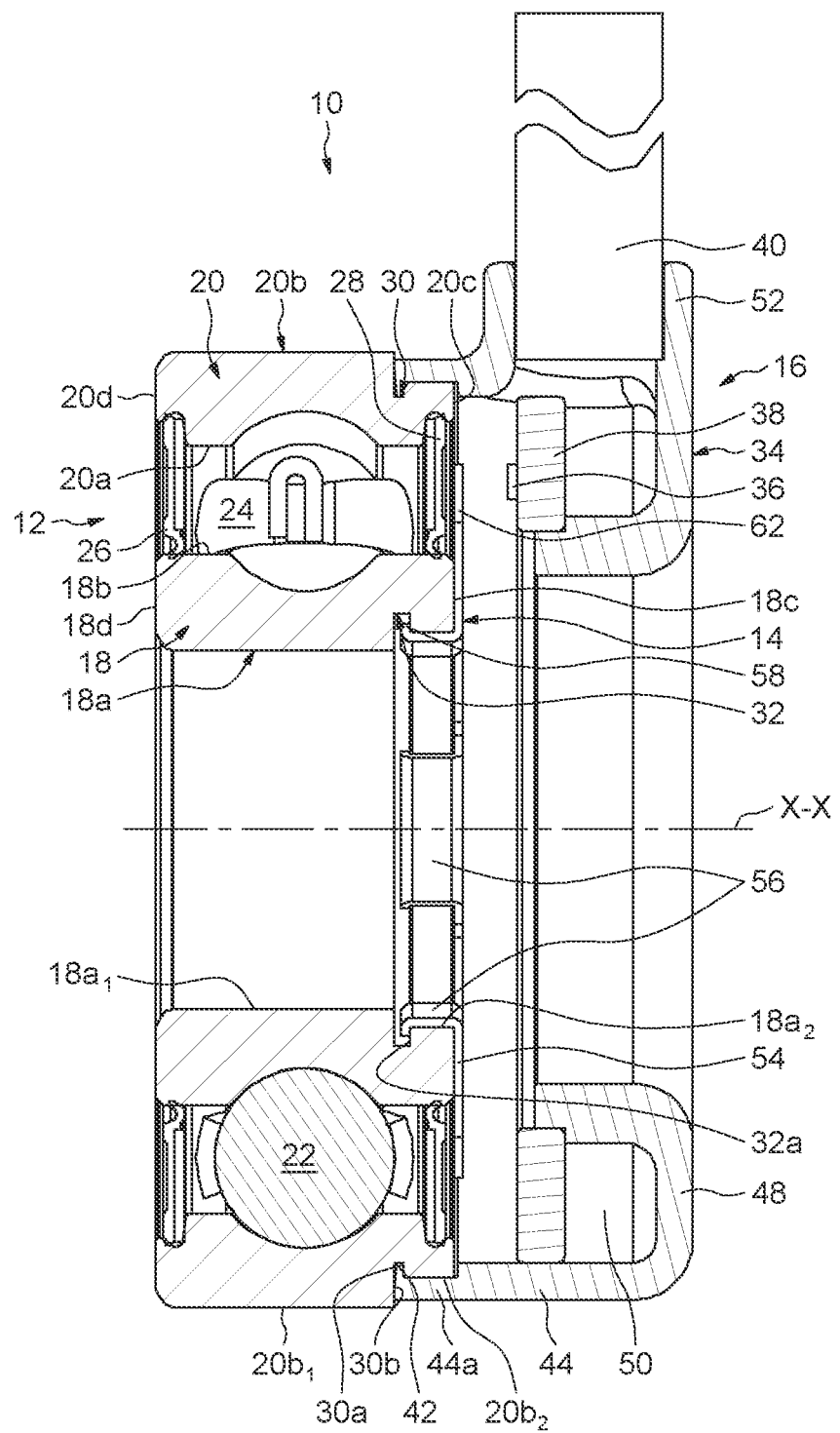
FIG. 1 is an axial section view of a sensor bearing unit according to an example of the invention.

The sensor bearing unit 10 illustrated in FIG. 1 is adapted to be used with an apparatus such as a motor, a brake system, a suspension system or any rotating machine, in particular for an automotive vehicle or a two-wheeled vehicle.

Figure 9:
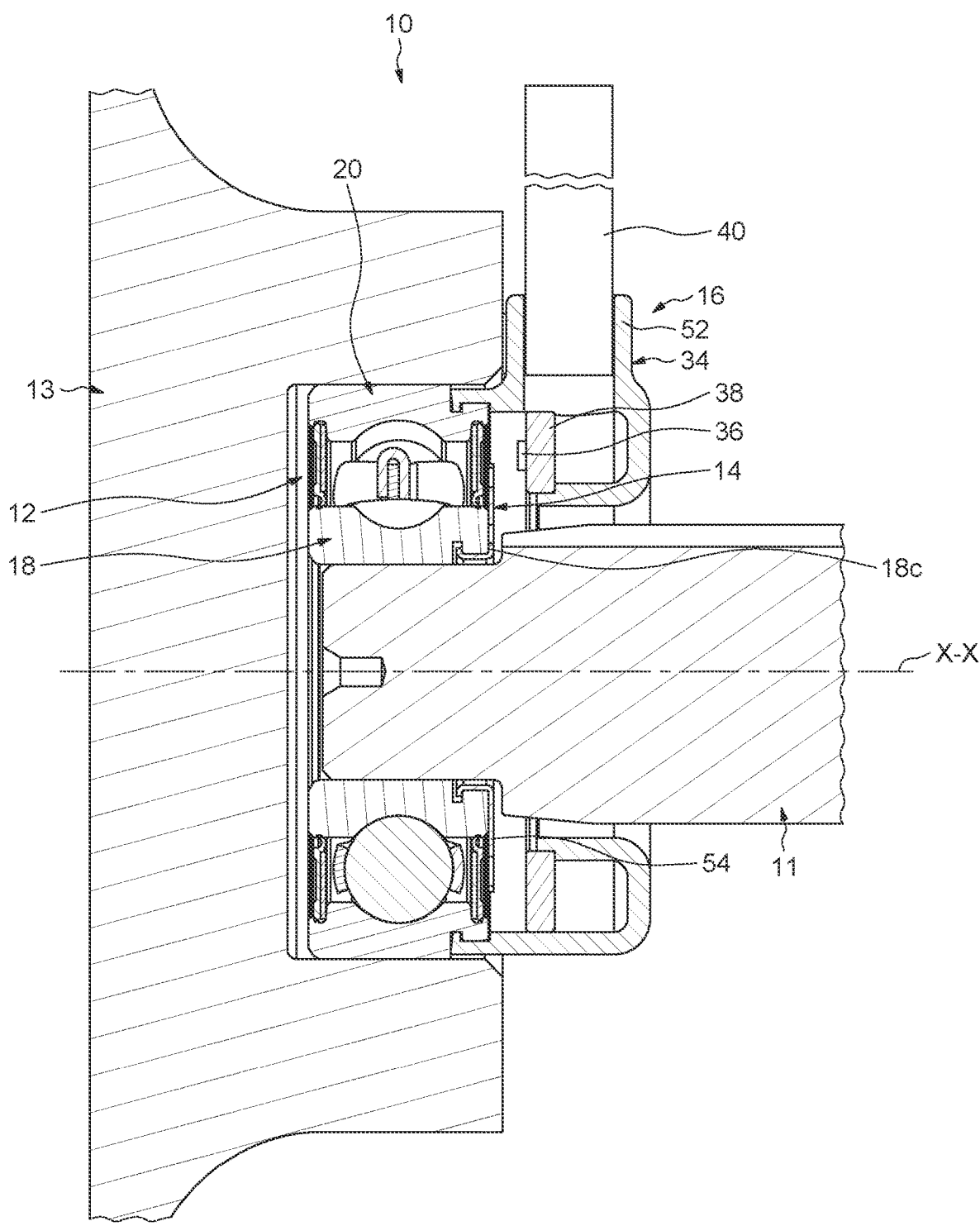
FIG. 9 is a partial axial section view of an apparatus provided with the sensor bearing unit of FIG. 1.

Such an apparatus is shown partially in FIG. 9 and is provided with a rotating shaft 11 and a non-rotating or fixed casing 13. If the apparatus is an electric motor, a rotor is secured to the shaft 11 and a stator is secured to the casing 13. The sensor bearing unit 10 is mounted on the shaft 11 and at least partially in the casing 13. The sensor bearing unit 10 may be received into a shield (not illustrated) of the casing 13. Alternatively, the sensor bearing unit 10 may be received into bore of the casing 13.

As shown in FIG. 1, the sensor bearing unit 10 comprises a bearing 12 and an impulse ring 14 and a sensor device 16 mounted on the bearing. The bearing 12 is intended to be mounted on the shaft 11 (FIG. 9) of the apparatus for tracking the rotation of the shaft.

The bearing 12 comprises a first ring 18 and a second ring 20. In the illustrated example, the first ring 18 is the inner ring and the second ring 20 is the outer ring. The inner and outer rings 18, 20 are concentric and extend axially along the bearing rotation axis X-X' which runs in an axial direction. The outer ring 20 radially surrounds the inner ring 18. The inner and outer rings 18, 20 are preferably made of steel.

As will be described later, the impulse ring 14 is secured to the inner ring 18 and the sensor device 16 is secured to the outer ring 20.

In the illustrated example, the bearing 12 also comprises a row of rolling elements 22, which are provided here in the form of balls, interposed between raceways (not referenced) formed on the inner and outer rings 18, 20.

The bearing 10 also comprises a cage 24 for maintaining the regular circumferential spacing of the rolling elements 20. The bearing 10 further comprises seals 26, 28 radially disposed between the inner and outer rings 18, 20 to define a closed space inside which the rolling elements 22 are arranged.

The inner ring 18 of the bearing is mounted on the outer surface of the shaft 11 (FIG. 9) of the apparatus. The inner ring 18 is intended to rotate while the outer ring 20 is intended to be fixed. The outer ring 20 is mounted into a bore of the fixed casing 13 (FIG. 9) of the apparatus.

The outer ring 20 is provided with a cylindrical inner surface or bore 20a and with an outer cylindrical surface 20b which is radially opposite the bore 20a. The outer surface 20b is located radially on the side opposite the inner ring 18. The bore 20a radially faces the inner ring 18. In the illustrated example, a toroidal circular raceway for the rolling elements 22 is formed from the bore 20a, the raceway being directed radially inwards. Two grooves (not referenced) are also formed on the bore 20a into which are secured the seals 26, 28.

The outer ring 20 is also provided with two opposite radial lateral faces 20c, 20d which axially delimit the bore 20a and the outer surface 20b of the ring.

Figure 2:
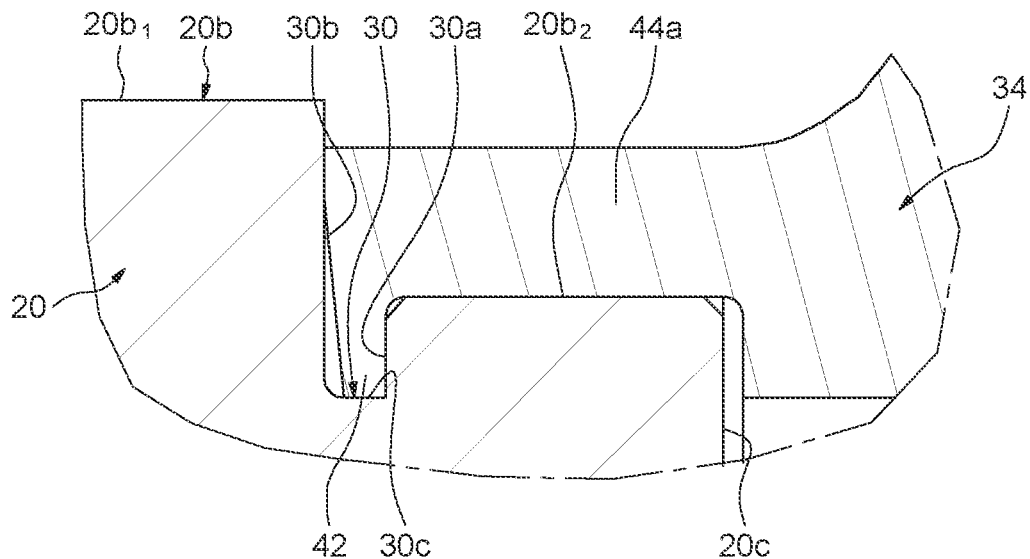
FIGS. 2 and 3 are detail views of portions of FIG. 1.

As shown more clearly in FIG. 2, a groove 30 is formed on the outer surface 20b of the outer ring. The groove 30 is oriented radially outwards, i.e. radially on the side opposite the inner ring. The groove 30 extends radially inwards from the outer surface 20b of the outer ring. In the illustrated example, the groove 30 has an annular form.

The groove 30 is axially delimited by two side walls 30a, 30b. The side walls 30a, 30b axially face each other. The side walls 30a, 30b are axially spaced apart from each other. The groove 30 also comprises a bottom 30c connected to the side walls 30a, 30b. The outer surface 20b of the outer ring and the bottom 30c of the groove are radially offset. The bottom 30c is radially offset inward with regard to the outer surface 20b. The side walls 30a, 30b of the groove extend radially. The bottom 30c extends axially. The groove 30 has a U-shaped cross-section.

In the illustrated example, the outer surface 20b of the outer ring has a stepped shape. The outer surface 20b is provided with a first cylindrical portion $20b_1$ and with a second cylindrical portion $20b_2$ which is radially offset inwards, i.e. towards the inner ring, with respect to the first cylindrical portion $20b_1$. The groove 30 is axially interposed between the first and second cylindrical portions $20b_1$, $20b_2$.

The side wall 30b of the groove axially delimits the first cylindrical portion $20b_1$. More precisely, the first cylindrical portion $20b_1$ is axially delimited by the lateral face 20d (FIG. 1) and the side wall 30b. The side wall 30a of the groove axially delimits the second cylindrical portion $20b_2$. More precisely, the second cylindrical portion $20b_2$ is axially delimited by the lateral face 20c and the side wall 30a.

Referring once again to FIG. 1, similarly to the outer ring 20, the inner ring 18 is provided with a cylindrical inner surface or bore 18a and with an outer cylindrical surface 18b which is radially opposite the bore 18a. The outer surface 18b radially faces the outer ring 20. The bore 18a is located radially on the side opposite to the outer ring 20. In the illustrated example, a toroidal circular raceway for the rolling elements 22 is formed from the outer surface 18b, the raceway being directed radially outwards.

The inner ring 18 is also provided with two opposite radial lateral faces 18c, 18d which axially delimit the bore 18a and the outer surface 18b of the ring.

Figure 3:
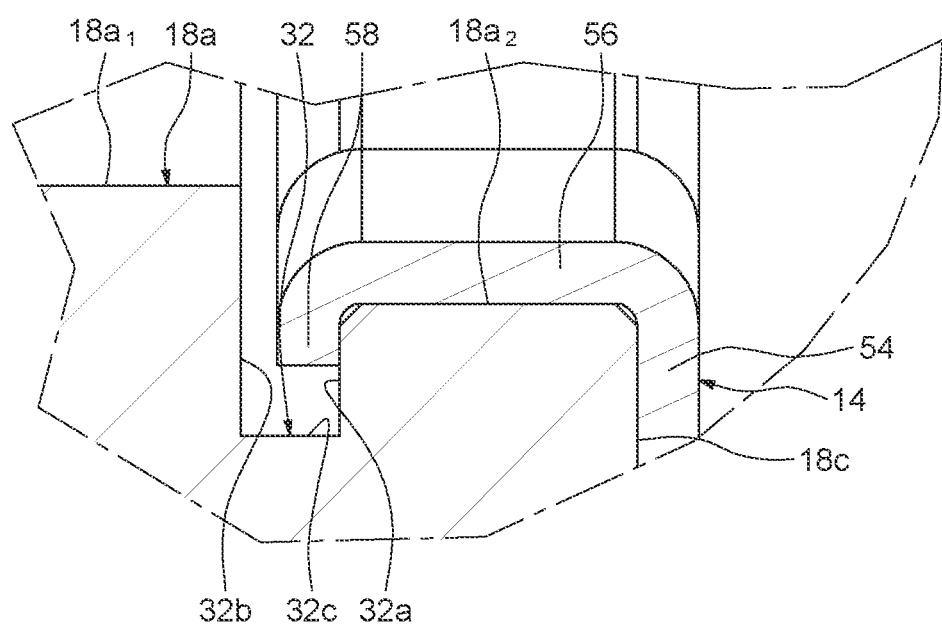
Figure 4:
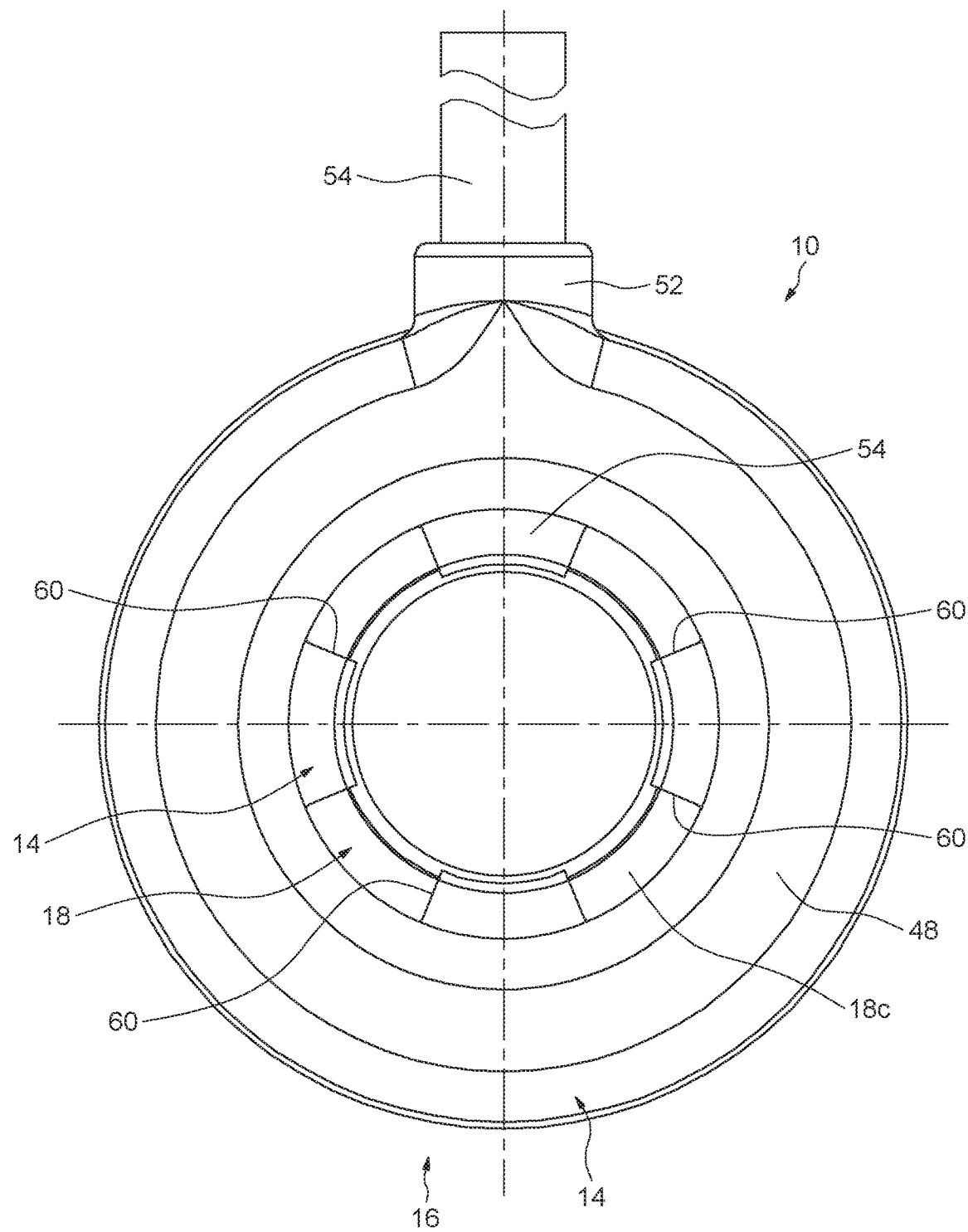
FIG. 4 is a front view of the sensor bearing unit of FIG. 1.

As shown more clearly in FIG. 3, a groove 32 is formed on the bore 18a of the inner ring. The groove 32 is oriented radially inwards, i.e. radially on the side opposite to the outer ring. The groove 32 extends radially outwards from the bore 18a of the inner ring. In the illustrated example, the groove 32 has an annular form.

The groove 32 is axially delimited by two side walls 32a, 32b. The side walls 32a, 32b axially face each other. The side walls 32a, 32b are axially spaced apart from each other. The groove 32 also comprises a bottom 32c connected to the side walls 32a, 32b. The bore 18a of the inner ring and the bottom 32c of the groove are radially offset. The bottom 32c is radially offset outward with regard to the bore 18a. In the illustrated example, the side walls 32a, 32b of the groove extend radially. Alternatively, the side wall 32b may extend obliquely. The bottom 32c extends axially. The groove 32 has here a U-shaped cross-section.

In the illustrated example, the bore 18a of the inner ring has a stepped shape. The bore 18a is provided with a first cylindrical portion $18a_1$ and with a second cylindrical portion $18a_2$ which is radially offset outwards, i.e. towards the outer ring, with respect to the first cylindrical portion $18a_1$. The groove 32 is axially interposed between the first and second cylindrical portions $18a_1$, $18a_2$.

The side wall 32b of the groove axially delimits the first cylindrical portion $18a_1$. More precisely, the first cylindrical portion $18a_1$ is axially delimited by the lateral face 18d (FIG. 1) and the side wall 32b. The side wall 32a of the groove axially delimits the second cylindrical portion $18a_2$. More precisely, the second cylindrical portion $18a_2$ is axially delimited by the lateral face 18c and the side wall 32a.

Referring once again to FIG. 1 and as previously indicated, the sensor device 16 is secured to the outer ring 20. The sensor device comprises a sensor body or housing 34 and sensor elements 36 (only one being visible in FIG. 1) supported by the sensor housing 34. The sensor device 16 also comprises a printed circuit board 38 secured to the sensor housing 34 and supporting the sensor elements 36. In the illustrated example, the sensor device 16 also comprises a connecting cable 40 for transmitting sensing data.

The sensor housing 34 has an annular form. The sensor housing 34 is secured into the groove 30 formed on the outer surface 20b of the outer ring. The sensor housing 34 is provided with an annular hook 42 engaged inside the groove 30 to axially retain the sensor housing 34 relative to the outer ring. The hook 42 extends radially. The hook 42 axially abuts against the radial side wall 30a of the groove. In the illustrated example, the hook 42 also radially abuts against the bottom 30c of the groove. Alternatively, a slight radial gap may remain between the hook 42 and the bottom 30c.

In the illustrated example, the sensor housing 34 is provided with an annular hook 42. Alternatively, the sensor housing 34 may be provided with a plurality of hooks 42 spaced apart in the circumferential direction, preferably regularly, and each engaged inside the groove 30 of the outer ring.

The sensor housing 34 comprises an annular outer axial portion 44 provided with the hook 42, an annular inner axial portion 46 and an annular radial portion 48 extending between the outer and inner axial portions. The outer and inner axial portions 44, 48 are concentric and coaxial with the axis X-X'.

The outer axial portion 44 of the sensor housing radially surrounds the inner portion 46. The outer axial portion 44 extends axially from the radial portion 48 towards the bearing 12. The outer axial portion 44 extends axially from a large-diameter edge of the radial portion 48.

A part 44a of the outer axial portion 44 radially surrounds the outer surface 20b of the outer ring. The hook 42 extends radially inwards from this part 44a of the outer axial portion 44. The part 44a of the outer portion 44 radially surrounding the outer surface 20b of the outer ring and the hook 42 form together a snapping portion of the sensor housing 34. The part 44a of the outer axial portion radially comes into contact with the outer surface 20b of the outer ring. The part 44a of the outer axial portion radially comes into contact with the second cylindrical portion $20b_2$ of the outer surface. The free end of the outer axial portion 44, namely the free end of the part 44a, axially abuts against the side wall 30b of the groove of the outer ring. The hook 42 is provided at the free end of the outer axial portion 44.

The part 44a of the outer axial portion is radially offset inwards, towards the inner ring 18, with respect to the first cylindrical portion $20b_1$ of the outer surface of the outer ring. In the illustrated example, the outer axial portion 44 is entirely radially offset inwards with respect to the first cylindrical portion $20b_1$.

The outer axial portion 44 of the sensor housing axially protrudes towards the bearing 12 with regard to the inner axial portion 46. The inner axial portion 46 defines the bore of the sensor housing 34. The inner axial portion 46 extends axially from the radial portion 48 towards the bearing 12. The inner axial portion 46 extends axially from a small-diameter edge of the radial portion 48. The inner axial portion 46 remains axially spaced apart from the bearing 12 and the impulse ring 14.

The sensor housing 34 defines an annular space 50 axially oriented towards the bearing 12. The space 50 is radially delimited by the outer and inner axial portions 44, 46. The space 50 is axially delimited by the radial portion 48.

In the illustrated example, the sensor housing 34 also comprises a cable output 52 inside which is engaged the cable 40. The cable output 52 forms a protruding portion extending radially outwards from the outer surface of the sensor housing 34. The cable output 52 protrudes radially outwards from the outer axial portion 44 of the sensor housing. Only the cable output 52 radially protrudes outwards with respect to the outer surface of the sensor housing 34.

In the illustrated example, the cable output 52 has a tubular form. Alternatively, the cable output 52 may have other shapes, for example a rectangular parallelepiped form. The cable 40 protrudes outwards from the cable output 52. The cable 40 is secured into the cable output 52 by any appropriate means, for example by press-fitting or gluing. The cable 40 comprises several electrical wires (not shown) connected to the printed circuit board 38.

In the illustrated example, the sensor device 16 is provided with the connecting cable 40 for transmitting sensing data. Alternatively, the connecting cable may be omitted from the sensor device 16 if wireless sensor elements are used. In this case, the sensor housing 34 does not include the cable output 52.

The sensor body 34 is made in one part. The sensor body 34 is made of a synthetic material. For example, the sensor body 34 may be made of Nylon 66 (PA 6.6) or Polybutylene terephthalate (PBT). Alternatively, the sensor body 34 can also be made from other materials, steel, for example.

The printed circuit board 38 is secured to the sensor housing 34. The printed circuit board 38 is housed inside the space 50 defined by the sensor housing 34. In the illustrated example, the printed circuit board 38 is secured to the inner axial portion 46 of the sensor body. Alternatively, the printed circuit board 38 may be secured to the outer axial portion 44 of the sensor body.

The sensor elements 36 are supported by the printed circuit board 38 which is itself supported by the sensor housing 34. As will be described later, the sensor elements 36 are mounted on the printed circuit board 38 axially on the side of the impulse ring 14.

As previously mentioned, the impulse ring 14 is secured to the inner ring 18. The impulse ring 14 is secured into the bore 18a of the inner ring. The impulse ring 14 is secured into the groove 32 formed on the bore 18a. In the disclosed example, the impulse ring 14 is made in one part. The impulse ring 14 is made of metal.

Figure 5:
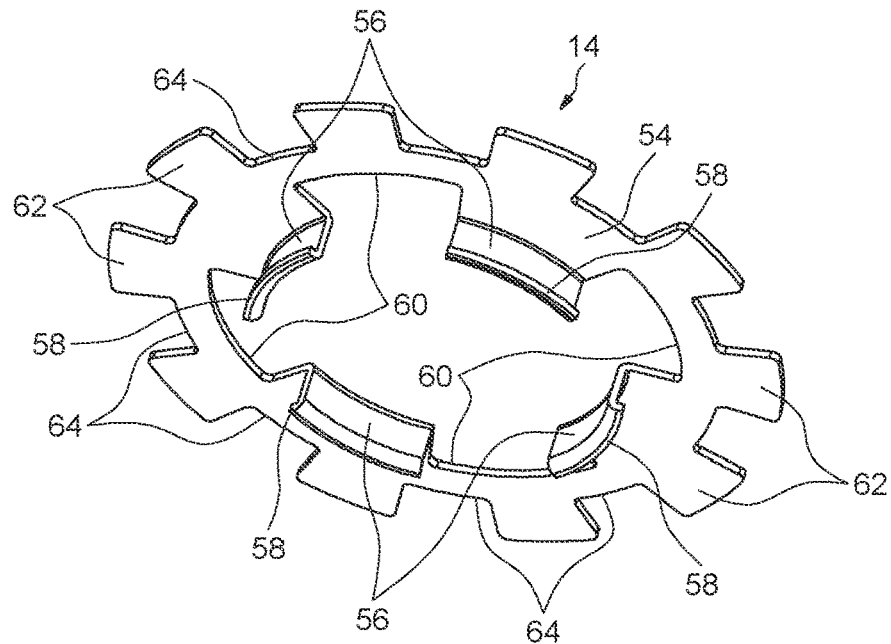
FIG. 5 is a perspective view of an impulse ring of the sensor bearing unit of FIG. 1.
Figure 6:
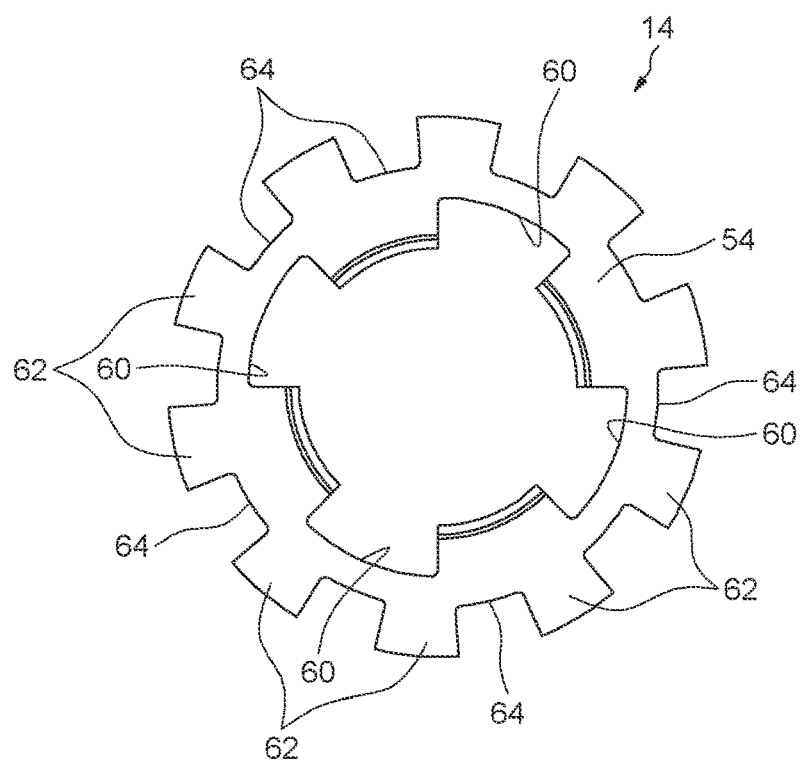
FIG. 6 is a front view of the impulse ring of FIG. 5.

As shown in FIGS. 1, 5 and 6, the impulse ring 14 comprises an annular radial portion 54 and a plurality of inner axial lugs 56 extending axially from the radial portion 54. The lugs 56 extend axially inwards the radial portion 54. The lugs 56 extend axially from a small-diameter edge of the radial portion 54. The lugs 56 are spaced apart in the circumferential direction, here regularly. The lugs 56 are here identical one to another. In the illustrated example, four lugs 56 are provided. Alternatively, a different number of lugs 56 may be envisioned, for example at least two lugs. For example, each lug 56 may extend over an angular sector comprised between 35° and 55°, and preferably be equal to 45°.

In the illustrated example, the impulse ring 14 is axially mounted against the lateral face 18c of the inner ring. The radial portion 54 of the impulse ring axially abuts the lateral face 18c. The lugs 56 are mounted into the bore 18a of the inner ring. The lugs 56 radially come into contact with the bore 18a. The lugs 56 radially come into contact with the second cylindrical portion $18a_2$ of the bore.

Each lug 56 is provided with a hook 58 extending radially and engaged inside the groove 32 to axially retain the impulse ring 14 relative to the inner ring 18. Each hook 58 extends radially outwards from the associated lug 56. Each hook 58 axially abuts against the radial side wall 32a of the groove. Each hook 58 is provided at the free end of the associated lug 56. Each hook 58 and the associated lug 56 have in cross-section a L-shape. The lugs 56 and the hooks 58 form together a snapping portion of the impulse ring 14.

As previously mentioned, in the illustrated example, the impulse ring 14 is provided with a plurality of axial lugs 56. Alternatively, the impulse ring 14 may be provided with an annular axial portion extending axially from the radial portion 54 and with the hooks 58 or with an annular hook engaged inside the groove 32 of the inner ring. In such case, the annular axial portion and the hooks 58, or the annular hook, form together the snapping portion of the impulse ring 14.

The impulse ring 14 is provided with a plurality of through-openings 60 formed on the radial portion 54. The openings 60 extend through the axial thickness of the radial portion 54. The openings 60 are spaced apart in the circumferential direction, here regularly. The openings 60 are here identical one to another. In the illustrated example, four openings 60 are provided. Alternatively, a different number of openings 60 may be foreseen, for example only one opening, or at least two openings 60. For example, each opening 60 may extend over an angular sector comprised between 35° and 55°, and preferably be equal to 45°. In the illustrated example, each through-opening 60 is circumferentially disposed between two successive lugs 56 while being radially offset outwards. Each through-opening 60 opens radially inwards.

Each through-opening 60 is formed on the radial portion 54 such that a part of the lateral face 18c of the inner ring is axially accessible from the outside through the opening 60. In other words, each opening 60 of the radial portion 54 leaves a part of the lateral face 18c of the inner ring uncovered.

Each through-opening 60 is formed on the radial portion 54 of the impulse ring to be radially located between the bore 18a and the outer surface 18b of the inner ring. Each through-opening 60 is radially offset outwards with respect to the bore 18a and radially offset inwards with respect to the outer surface 18b. The inner diameter of each through-opening 60 is larger than the diameter of the bore 18a, and its outer diameter is smaller than the diameter the outer surface 18b.

The impulse ring 14 is also provided with a plurality of teeth 62 at its periphery. The teeth 62 are regularly spaced apart in the circumferential direction. A recess or aperture 64 is provided between each pair of successive teeth 62. Hence, the impulse ring 14 is provided with alternating teeth 62 and apertures 64.

As previously mentioned, each sensor element 36 is mounted on the printed circuit board 38 axially on the side of the impulse ring 14. Each sensor element 36 axially faces the impulse ring 14. The sensor elements 36 are disposed on the same diameter on the printed circuit board 38. Each sensor element 36 axially faces one of the teeth 62 or apertures 64 of the impulse ring. The sensor elements 36 are regularly spaced apart in the circumferential direction. For example, the sensor device 16 may comprise three sensor elements 36. Alternatively, a different number of sensor elements 36 may be envisioned, for example one or two sensor elements 36 or at least four sensor elements 36.

Preferably, the sensor elements 36 use induction technology. Each sensor element 36 may include an inductive switch sensor such as a sensing coil. The switch of each sensor element 36 is triggered by the metal impulse ring 14. The teeth 62 and apertures 64 of the impulse ring are used as differential inductance field reference.

As an alternative, the impulse ring 14 and the sensors element 36 may use any other suitable technology instead of induction technology. For example, optical technology or magnetic technology may be implemented. In case of magnetic technology, the impulse ring 14 may include alternating North and South poles and the sensor elements 36 may include Hall-effect sensors.

Figure 7:
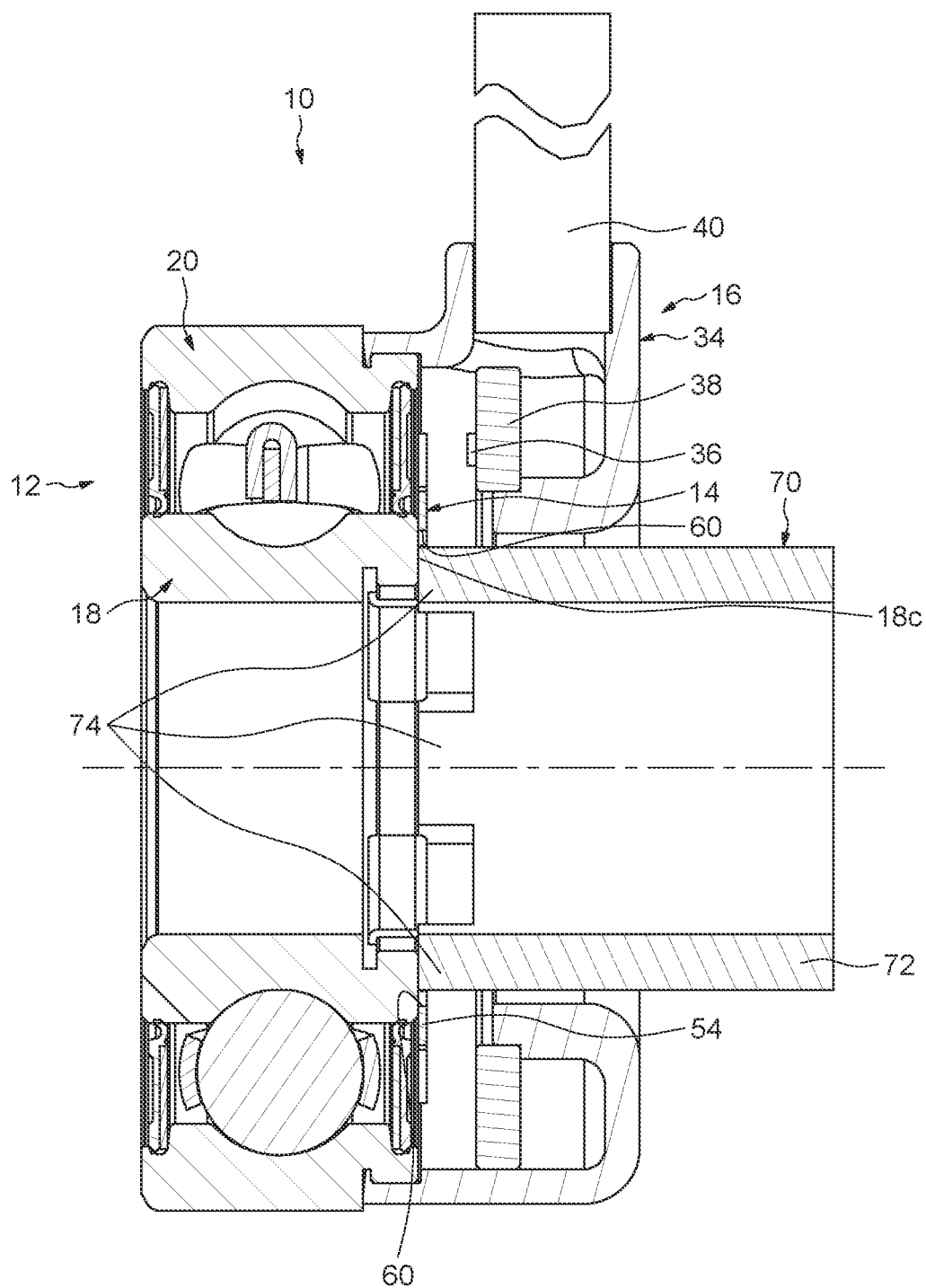
FIG. 7 is an axial view of the sensor bearing unit of FIG. 1 and a mounting tool.
Figure 8:
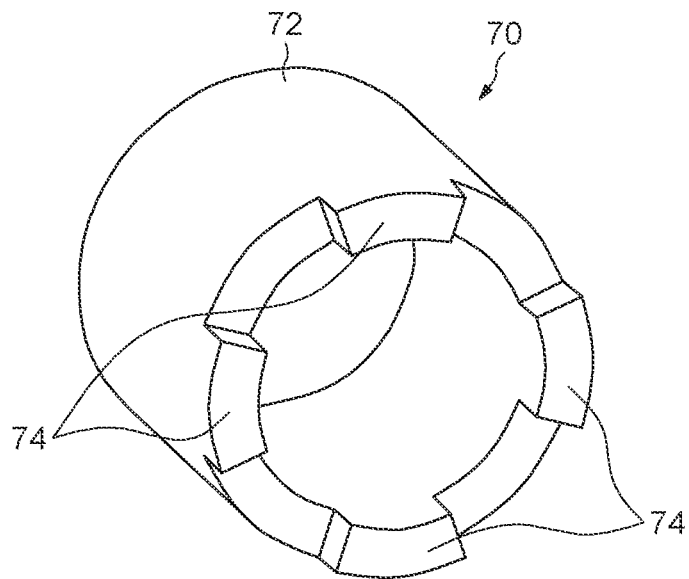
FIG. 8 is a perspective view of the mounting tool of FIG. 7.

As previously mentioned, the bearing 12 is intended to be mounted inside a non-rotating member such as the casing 13 (FIG. 9) of the associated apparatus. To this end, a mounting tool 70 as shown in FIGS. 7 and 8 may be used.

The tool 70 comprises an annular gripping portion 72 and a plurality of axial teeth 74 extending axially at one end of the gripping portion 72. The teeth 74 are spaced apart in the circumferential direction. Here, the teeth 74 are identical one to another. The number of teeth 74 of the tool is equal to the number of through-openings 60 of the impulse ring. The angular dimension of each tooth 74 is smaller than the one of the through-openings 60. Each tooth 74 is configured to be engaged into one of the through-openings 60 of the impulse ring 14 without contact with the impulse ring 14.

The assembly of the sensor bearing unit 10 inside the casing of the associated apparatus is done with the tool 70.

Firstly, the tool 70 is positioned such that each tooth 74 extends through one of the openings 60 of the impulse ring and axially come into contact with the lateral face 18c of the inner ring of the bearing. The through-openings 60 of the impulse ring allow the passage of the teeth 74 of the tool to axially abut directly on the lateral face 18c as shown in FIG. 7.

The tool 70 is partly located inside the bore of the sensor housing 34 of the sensor bearing unit 10. The axial contact between the teeth 74 of the tool and the lateral face 18c of the inner ring is the only contact between the tool 70 and the sensor bearing unit 10. There is no contact between the tool 70 and the impulse ring 14, or between the tool and the sensor housing 34.

Secondly, an axial force is exerted directly onto the lateral face 18c of the inner ring of the bearing with the aid of the tool 70 in order to mount into the casing the outer ring 20 of the bearing. Preferably, the outer ring 20 is press-fitted into the casing. The through-openings 60 of the impulse ring enable an axial force to be applied directly on the inner ring 18 of the bearing during the installation of the sensor bearing unit 10 into the casing.

Once the assembly of the sensor bearing unit 10 inside the casing 13 of the associated apparatus is achieved, the shaft 11 is mounted inside the bore of the inner ring 18 of the bearing.

As previously mentioned, in this illustrated example, the first ring of the rolling bearing is the inner rotatable ring whereas the second ring is the outer fixed ring. As an alternative, it could be possible to provide a reversed arrangement with the first ring forming the outer rotatable ring and the second ring forming the inner fixed ring. In this case, the impulse ring 14 is secured to the outer ring, and the sensor device 16 may be secured to the inner ring or on another part of the sensor bearing unit according to the design of this unit.

Figure 10:
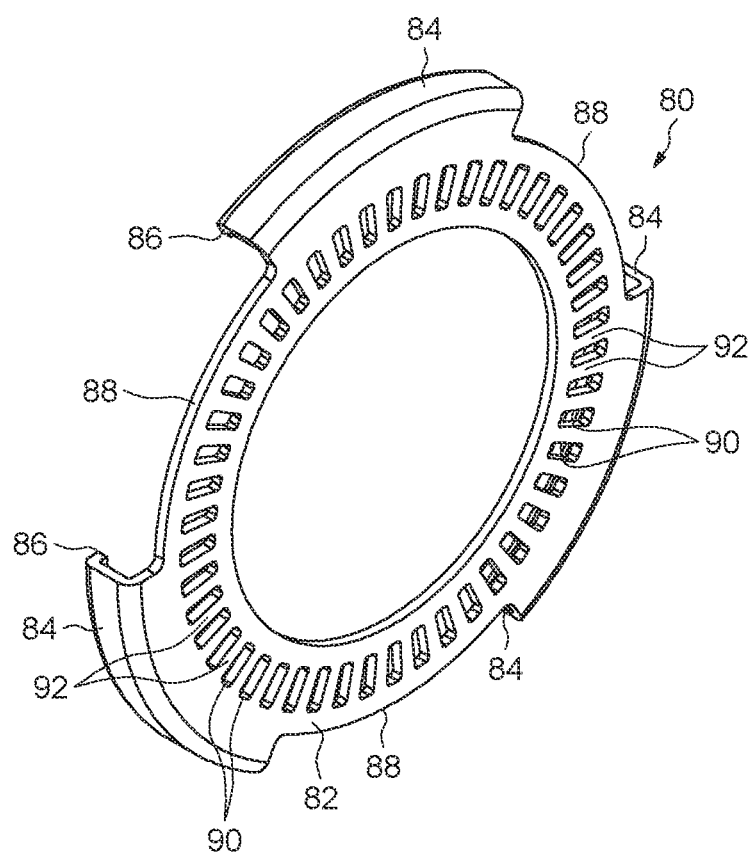
FIG. 10 is a perspective view of an impulse ring of a sensor bearing unit according to a second example of the disclosure.

FIG. 10 shows an impulse ring 80 adapted to be secured to the outer ring 20 of the bearing. The impulse ring 80 comprises an annular radial portion 82 and a plurality of outer axial lugs 84 extending axially from the radial portion 82. Each lug 84 extends axially from the radial portion 82. Each lug 84 extends axially from a large-diameter edge of the radial portion 82. The lugs 84 are spaced apart in the circumferential direction, here regularly. The lugs 84 are here identical one to another. In the illustrated example, three lugs 84 are provided. Alternatively, a different number of lugs 84 may be foreseen, for example at least two lugs. For example, each lug 84 may extend over an angular sector of from 35° to 55°, and preferably be equal to 45°.

The impulse ring 14 is axially mounted against the lateral face 20c (FIG. 1) of the outer ring of the bearing. The outer ring 20 is intended to mounted into the casing, and the lateral face 20c is intended to be taken as reference face for the assembly tool. The radial portion 82 of the impulse ring axially abuts against this lateral face. The lugs 84 are mounted radially around the outer surface of the outer ring. The lugs 84 radially come into contact with the outer surface.

Similarly to the first example, each lug 84 is provided with a hook 86 extending radially inwards and engaged inside a groove formed on the outer surface of the outer ring to axially retain the impulse ring 14 relative to the outer ring. The groove may be similar to the groove 30 into which the hooks of the sensor assembly are engaged in the first example. Each hook 86 is provided at the free end of the associated lug 84. Each hook 86 and the associated lug 84 have in cross-section a L-shape. The lugs 84 and the hooks 86 form together a snapping portion of the impulse ring 14.

The impulse ring 14 is provided with a plurality of through-openings 88 formed on the radial portion 82. The openings 88 extend through the axial thickness of the radial portion 82. The openings 88 are spaced apart in the circumferential direction, here regularly. The openings 88 are here identical one to another. In the illustrated example, three openings 88 are provided. Alternatively, a different number of openings 88 may be foreseen, for example only one opening, or at least two openings 88. For example, each opening 88 may extend over an angular sector of 35° to 55°, and preferably be equal to 45°. In the illustrated example, each through-opening 88 is circumferentially disposed between two adjacent lugs 84 while being radially offset inwards. Each through-opening 88 opens radially outwards. With the through-openings 88, the radial portion 82 is provided at its periphery with radial sectors, here three.

Each through-opening 88 is formed on the radial portion 82 such that a part of the lateral face of the outer ring against which the impulse ring is mounted is accessible from the outside through the opening 88. In other words, each opening 88 of the radial portion 82 leaves exposed a part of the lateral face of the outer ring. Similarly to the first example, the through-openings 88 of the impulse ring allow a tool to axially push directly on the outer ring of the bearing during the installation of the sensor bearing unit 10.

Each through-opening 88 is formed on the radial portion 82 of the impulse ring to be radially located between the bore and the outer surface of the outer ring. Each through-opening 88 is radially offset outwards with respect to the bore of the outer ring and radially offset inwards with respect to the outer surface of the outer ring.

In this example, the impulse ring 80 is also provided with a plurality of through slots or apertures 90 regularly spaced apart in the circumferential direction. The apertures 90 extend through the axial thickness of the radial portion 82. The apertures 90 are radially offset inwards with regard to the through-openings 88. A tooth 92 is formed between each pair of successive apertures 90. Hence, the impulse ring 14 is provided with alternating teeth 92 and apertures 90.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sensor bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sensor bearing unit comprising:
   a bearing including a first ring and a second ring centered on an axis, and
   an impulse ring secured to the first ring of the bearing,
   wherein the impulse ring includes a radial portion mounted in axial contact against a lateral face of the first ring of the bearing, and at least one opening extending through the thickness of the radial portion such that a part of the lateral face of the first ring of the bearing is exposed through the at least one opening.

2. The sensor bearing unit according to claim 1, wherein the at least one opening is radially located between a cylindrical bore of the first ring and the cylindrical outer surface of the first ring.

3. The sensor bearing unit according to claim 1, wherein the at least one openings comprises a plurality of circumferentially spaced openings.

4. The sensor bearing unit according to claim 1, wherein the impulse ring is secured into a groove formed on a cylindrical surface of the first ring, the cylindrical surface being located radially opposite the second ring.

5. The sensor bearing unit according to claim 1, further comprising a sensor device for detecting rotational parameters of the impulse ring, the sensor being secured to the second ring.

6. The sensor bearing unit according to claim 5, wherein the sensor device comprises a sensor housing secured to the second ring of the bearing and at least one sensor element supported by the sensor housing and cooperating with the impulse ring.

7. The sensor bearing unit according to claim 6, wherein the impulse ring is made of metal and provided with alternating teeth and apertures and wherein the sensor element is configured to sense the teeth and apertures.

8. The sensor bearing unit according to claim 7,
   wherein the at least one opening is spaced radially inward or radially outward from the teeth and apertures.

9. The sensor bearing unit according to claim 6,
   wherein the impulse ring is provided with alternating first and second regions,
   wherein the sensor element is configured to sense the alternating first and second regions, and
   wherein the at least one opening is spaced radially inward or radially outward from the first and second regions.

10. A kit comprising:
    the sensor bearing unit according to claim 1, and
    a mounting tool including at least one tooth configured to axially engage into the at least one opening of the impulse ring and to contact the lateral face of the first ring without contacting the impulse ring.

11. A kit comprising:
    the sensor bearing unit according to claim 1, and
    a mounting tool including at least one tooth configured to engage the lateral face of the first ring through the at least one opening without contacting an axial surface of the impulse ring.

12. The installation method according to claim 11,
    wherein the mounting tool does not contact an axial surface of the impulse ring during the pushing.

13. An installation method comprising:
    providing the sensor bearing unit according to claim 1;
    mounting the first ring in an opening of a casing or onto a shaft by pushing directly axially on the exposed part of the lateral face with a mounting tool having at least one tooth contacting the exposed lateral face.

* * * * *